(12) United States Patent
Asada et al.

(10) Patent No.: US 10,386,839 B2
(45) Date of Patent: Aug. 20, 2019

(54) MOBILE ROBOT THAT EMULATES PEDESTRIAN WALKING BEHAVIOR

(71) Applicants: Boston Incubator Center, LLC, Waltham, MA (US); East Japan Railway Company, Saitama-shi, Saitama-prefecture (JP)

(72) Inventors: Haruhiko Harry Asada, Lincoln, MA (US); Kota Weaver, Allston, MA (US); Baldin Lloren-Bonilla, Cambridge, MA (US); Sheng Liu, Cambridge, MA (US); Jun Maruyama, Minami-ku (JP)

(73) Assignees: Boston Incubator Center, LLC, Lexington, MA (US); East Japan Railway Company, Saitama (JP)

(*) Notice: Subject to any disclaimer, the term of this patent is extended or adjusted under 35 U.S.C. 154(b) by 0 days.

(21) Appl. No.: 15/607,325

(22) Filed: May 26, 2017

(65) Prior Publication Data

US 2018/0107217 A1    Apr. 19, 2018

Related U.S. Application Data

(60) Provisional application No. 62/342,133, filed on May 26, 2016.

(51) Int. Cl.
*G05D 1/00* (2006.01)
*G05D 1/02* (2006.01)
*G08G 1/005* (2006.01)

(52) U.S. Cl.
CPC ......... *G05D 1/0088* (2013.01); *G05D 1/0223* (2013.01); *G05D 2201/0217* (2013.01); *G08G 1/005* (2013.01)

(58) Field of Classification Search
CPC .............. G05D 1/0088; G05D 1/0223; G05D 2201/0217; G08G 1/166
(Continued)

(56) References Cited

U.S. PATENT DOCUMENTS 8,564,657 B2 * 10/2013 Michalke ................ G06T 7/251
 348/116
8,918,209 B2 * 12/2014 Rosenstein ............ B25J 11/009
 700/254

(Continued)

*Primary Examiner* — Atul Trivedi
(74) *Attorney, Agent, or Firm* — Spano Law Group; Joseph S. Spano

(57) ABSTRACT

Methods and systems for navigating a mobile robot through a crowded pedestrian environment based on a trained navigation model are described herein. The trained navigation model receives measurement data identifying nearby pedestrians and the velocity of each nearby pedestrian relative to the mobile robot, and the current position and desired endpoint position of the mobile robot in the crowded pedestrian environment. Based on this information, the trained navigation model generates command signals that cause the mobile robot to adjust its velocity. By repeatedly sampling the velocities of surrounding pedestrians and current location, the navigation model directs the mobile robot toward the endpoint location with a minimum of disruption to the pedestrian traffic flows. The navigation model is trained to emulate desirable pedestrian walking behaviors in a crowded pedestrian environment by tracking the movement of a behavioral trainer through a crowded pedestrian environment.

20 Claims, 7 Drawing Sheets

(58) Field of Classification Search
USPC .......................................................... 701/501
See application file for complete search history.

(56) References Cited

U.S. PATENT DOCUMENTS

| | | | | |
|---|---|---|---|---|
| 8,930,019 | B2* | 1/2015 | Allen | G06F 1/1632 348/46 |
| 9,014,848 | B2* | 4/2015 | Farlow | B25J 11/009 700/245 |
| 9,233,472 | B2* | 1/2016 | Angle | H04L 12/282 |
| 9,420,741 | B2* | 8/2016 | Balutis | G05D 1/0265 |
| 9,643,722 | B1* | 5/2017 | Myslinski | B64C 39/024 |
| 10,061,318 | B2* | 8/2018 | Myslinski | B64C 39/024 |
| 2007/0192910 | A1* | 8/2007 | Vu | B25J 5/007 700/245 |
| 2008/0086236 | A1* | 4/2008 | Saito | G01S 5/0252 700/245 |
| 2012/0143495 | A1* | 6/2012 | Dantu | G01C 21/206 701/428 |
| 2012/0185094 | A1* | 7/2012 | Rosenstein | B25J 11/009 700/259 |
| 2012/0197464 | A1* | 8/2012 | Wang | B25J 9/1689 701/2 |
| 2013/0204437 | A1* | 8/2013 | Koselka | A01D 46/30 700/259 |
| 2013/0325244 | A1* | 12/2013 | Wang | G05D 1/028 701/26 |
| 2014/0095007 | A1* | 4/2014 | Angle | B25J 5/007 701/23 |
| 2015/0185034 | A1* | 7/2015 | Abhyanker | G01C 21/36 701/23 |
| 2015/0212521 | A1* | 7/2015 | Pack | G01C 21/30 701/28 |
| 2016/0188977 | A1* | 6/2016 | Kearns | G06K 9/00664 348/113 |
| 2016/0378117 | A1* | 12/2016 | Szatmary | B25J 5/00 382/153 |
| 2017/0061034 | A1* | 3/2017 | Ritchey | G16H 40/63 |
| 2018/0157259 | A1* | 6/2018 | Myslinski | G08B 21/18 |
| 2018/0173223 | A1* | 6/2018 | Doane | B60W 30/08 |
| 2018/0246512 | A1* | 8/2018 | Martinson | G05D 1/0088 |

* cited by examiner

MOBILE ROBOT THAT EMULATES PEDESTRIAN WALKING BEHAVIOR

CROSS REFERENCE TO RELATED APPLICATIONS

The present application for patent claims priority under 35 U.S.C. § 119 from U.S. provisional patent application Ser. No. 62/342,133, entitled "Mobile Robot That Emulates Pedestrian Walking Behaviors," filed May 26, 2016, the subject matter of which is incorporated herein by reference in its entirety.

TECHNICAL FIELD

The described embodiments relate to systems and methods for mobile robot navigation in a crowded pedestrian environment.

BACKGROUND INFORMATION

Robotic vehicles operating in a service environment such as a hospital, public transportation station, etc., are often required to operate autonomously in crowded spaces. A mobile robot that navigates a predefined course through a crowded pedestrian environment is likely to severely impede pedestrian traffic flow, and may lead to collisions with pedestrians. Conversely, a mobile robot that navigates through a crowded pedestrian environment by avoiding surrounding pedestrians will find it difficult, if not impossible, to successfully navigate to a desired endpoint location. Improper navigation of a mobile robot through a crowded pedestrian environment can create a hazardous situation as the mobile robot is operating in close proximity to humans. It is especially concerning if the mobile robot is carrying heavy payloads and is capable of high acceleration maneuvers.

In summary, improvements in the design and control of wheeled, robotic vehicles are desired to improve operational safety in a crowded pedestrian environment. More specifically, a resolution to the conflicting objectives of navigating to a desired endpoint location, while avoiding significant disruption of pedestrian traffic flows is desired.

SUMMARY

Methods and systems for navigating a mobile robot through a crowded pedestrian environment based on a trained navigation model are described herein. In one aspect, the trained navigation model receives measurement data identifying nearby pedestrians and the velocity of each nearby pedestrian relative to the mobile robot, the current position and the desired endpoint position of the mobile robot in the crowded pedestrian environment. Based on this information, the trained navigation model generates command signals that cause the mobile robot to adjust its velocity. By repeatedly sampling the velocities of surrounding pedestrians and current location, the navigation model directs the mobile robot toward the endpoint location with a minimum of disruption to the pedestrian traffic flows.

In a further aspect, the navigation model is trained to emulate pedestrian walking behaviors in a crowded pedestrian environment. The navigation model is trained based on numerous sets of pedestrian walking maneuvers. Each maneuver involves tracking the movement of a behavioral trainer through a crowded pedestrian environment from a particular starting location to a particular endpoint location. The position and velocity of nearby pedestrians relative to the trainer are periodically measured, along with the position and velocity of the trainer itself. Together, this information is used to train the navigation model.

In a further aspect, the behavioral trainers employed to generate teaching data for navigation model training are selected to reinforce desired pedestrian walking behaviors. It is desirable to limit the set of behavioral trainers to those who exhibit desired pedestrian walking behaviors, and exclude those who exhibit undesirable pedestrian walking behaviors.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for navigating a mobile robot through a crowded pedestrian environment based on a trained navigation model are described herein. The crowded, pedestrian environment includes significant flows of moving people (e.g., a train station, a hospital environment, an airport, etc.).

In one aspect, a mobile robot navigates through a crowded pedestrian environment based on a trained navigation model. At any given sampling point, the trained navigation model receives measurement data identifying nearby pedestrians and the velocity of each nearby pedestrian relative to the mobile robot. Based on the pedestrian velocity information, the current position of the mobile robot in the service environment, and the desired endpoint position of the mobile robot in the service environment, the trained navigation model generates command signals that cause the mobile robot to adjust its velocity. By repeatedly sampling the velocities of surrounding pedestrians and current location, the navigation model directs the mobile robot toward the endpoint location in the service environment with a minimum of disruption to the pedestrian traffic flows within the service environment.

In a further aspect, the navigation model is trained to emulate pedestrian walking behaviors in a crowded pedestrian environment. The navigation model is trained based on numerous sets of pedestrian walking maneuvers. Each maneuver involves tracking the movement of a trainer (e.g., a particular pedestrian or a human controlled mobile robot) through a crowded pedestrian environment from a particular starting location to a particular endpoint location. A diverse set of pedestrian walking maneuvers includes many different starting locations and endpoint locations within the service environment. During each pedestrian walking maneuver, the position and velocity of nearby pedestrians relative to the trainer are periodically measured, along with the position and velocity of the trainer itself. Together, this information is used to train the navigation model. In this manner, the navigation module is trained to emulate the walking behaviors of a human through a particular crowded pedestrian environment. As a result, a mobile robot employing the navigation model is able to follow a stream of pedestrians walking in the same or similar direction, rather than coping with pedestrians moving in the opposite or different directions. The trained navigation model is particular to the service environment from which the training data is derived.

Figure 1:
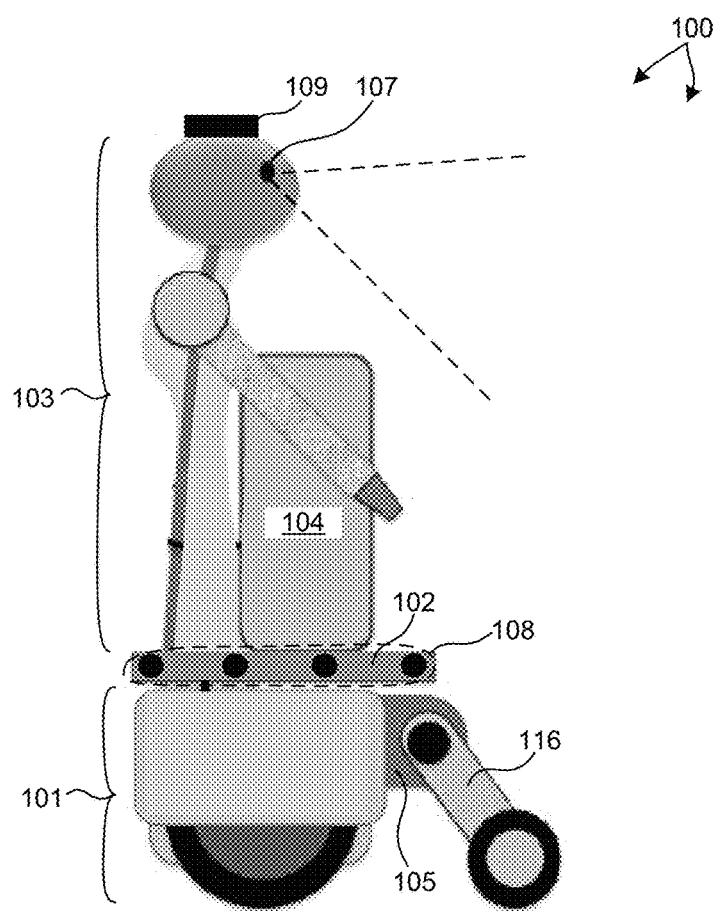
FIG. 1 is a diagram illustrative of an embodiment of a mobile robot 100 in at least one novel aspect.

FIG. 1 depicts a mobile robot 100 configured as a service robot in one embodiment. Mobile robot 100 includes a wheeled, robotic vehicle 101 with driving and steering wheels attached to a frame 105 of the vehicle 101. Mobile robot 100 also includes a payload platform 102 configured to carry a payload 104. In addition, mobile robot 100 includes an upper body robot 103 configured to secure the payload 104 to the payload platform 102 and interact with users of mobile robot 100. In one example, mobile robot 100 operates in a public transportation station (e.g., train station) and assists passengers with the transport of their luggage through the station. In another example, mobile robot 100 operates in a public area and assists the public with refuse disposal. In this example, payload 104 includes a refuse container.

Figure 2:
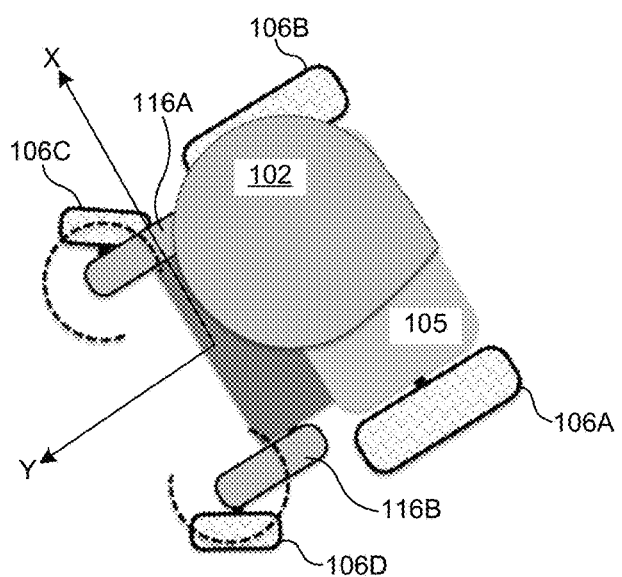
FIG. 2 depicts a top view of mobile robot 100 in one embodiment.

FIG. 2 depicts a top view of the wheeled, robotic vehicle 101 and payload platform 102 of mobile robot 100. As depicted in FIG. 2, wheeled robotic vehicle 101 includes drive wheels 106A and 106B and steering wheels 106C and 106D. In some embodiments, steering wheels 106C and 106D are passive wheels that are free to rotate about multiple axes. In these embodiments, steering wheels 106C and 106D function primarily to support the load normal to the ground surface, while the rotations of drive wheels 106A and 106D dictate the motion trajectory of the wheeled, robotic vehicle 101. In some other embodiments, the orientation of steering wheels 106C and 106D about an axis normal to the ground surface is actively controlled. In these embodiments, steering wheels 106C and 106D also function to control the direction of the motion trajectory of the wheeled, robotic vehicle 101. In some other embodiments, both the rotation of steering wheels 106C and 106D and the orientation of steering wheels 106C and 106D about an axis normal to the ground surface are actively controlled. In these embodiments, steering wheels 106C and 106D function to control both the direction of the motion trajectory and the velocity along the motion trajectory of the wheeled, robotic vehicle 101.

As depicted in FIG. 1, mobile robot 100 includes an image capture system 107, a range finding sensor system 108, and a LIDAR sensor system 109. Image capture system 107 includes one or more image capture devices (e.g., cameras, etc.) that capture images of people and objects in the vicinity of mobile robot 100. Range finding sensor system 108 includes one or more range finding sensors (e.g., laser based, sonar, radar based range finding sensors) that estimate the distance between mobile robot 100 and people or objects in the vicinity of mobile robot 100. LIDAR sensor system 109 includes one or more LIDAR devices that estimate the distance between mobile robot 100 and people and objects in the vicinity of mobile robot 100. Image data collected by image capture system 107, range data collected by range finding sensor system 108, and range data collected by LIDAR sensor system 109, or any combination, is employed to estimate the presence of pedestrians in the vicinity of mobile robot 100 and their velocities relative to mobile robot 100.

Any of the image capture system, range finding sensor system, and LIDAR sensor system may be configured with any suitable field of view. In some embodiments, any of the image capture system, range finding sensor system, and LIDAR sensor system is configured to sense people and objects within a full three hundred sixty degree field of view around mobile robot 100. However, in some other embodiments, the field of view of any of the image capture system, range finding sensor system, and LIDAR sensor system may be restricted to a particular range or set of ranges of angles around mobile robot 100. The fields of view of any of the image capture system, range finding sensor system, and LIDAR sensor system may be configured to fully overlap, partially overlap, or not overlap at all. In a preferred embodiment, the fields of view of at least two sensor subsystems overlap to generate redundancy in the collected sensor data. In some examples, redundant data collection improves the identification and estimation of velocity of pedestrians nearby mobile robot 100.

Although mobile robot 100 depicted in FIG. 1 includes an image capture system, a range finding sensor system, and a LIDAR sensing system, in general, a mobile robot as described herein may include any combination of these systems. Similarly, a mobile robot as described herein may include any suitable arrangement of sensors employed to identify and estimate the velocity of pedestrians nearby mobile robot 100.

In some embodiments, mobile robot 100 includes an electronic device (not shown) suitable for locating the mobile robot 100 within a service environment in which the mobile robot 100 is confined to operate (e.g., a train station). In one embodiment, mobile robot 100 includes a radio frequency (RF) beacon that communicates with similar beacons fixedly positioned within the service environment as part of an indoor positioning system. Based on communication among these beacons, mobile robot 100 is able to locate itself within the service environment.

In some other embodiments, image data collected by image capture system 107, range data collected by range finding sensor system 108, and range data collected by LIDAR sensor system 109, or any combination, is employed to estimate the current location of the mobile robot within a service environment. In one example, image data collected by image capture system 107 includes images of fiducials fixedly mounted throughout the service environment (e.g., a train station, hospital, etc.). By performing image processing operations on the fiducial images, computing system 200 determines the location and orientation (e.g., x-position, y-position, and Rz orientation) with respect to the service environment. In one example, the fiducials and image processing software are available from April Robotics Laboratory, University of Michigan, Ann Arbor, Mich. (USA). In another example, computing system 200 assembles images from range data collected by LIDAR sensor system 109. In addition, an image map of the service environment is stored in memory on-board mobile robot 100. Computing system 200 employs a simultaneous localization and mapping (SLAM) technique to compare the assembled images with the image map of the service environment to estimate the location of mobile robot 100 within the service environment.

Figure 3:
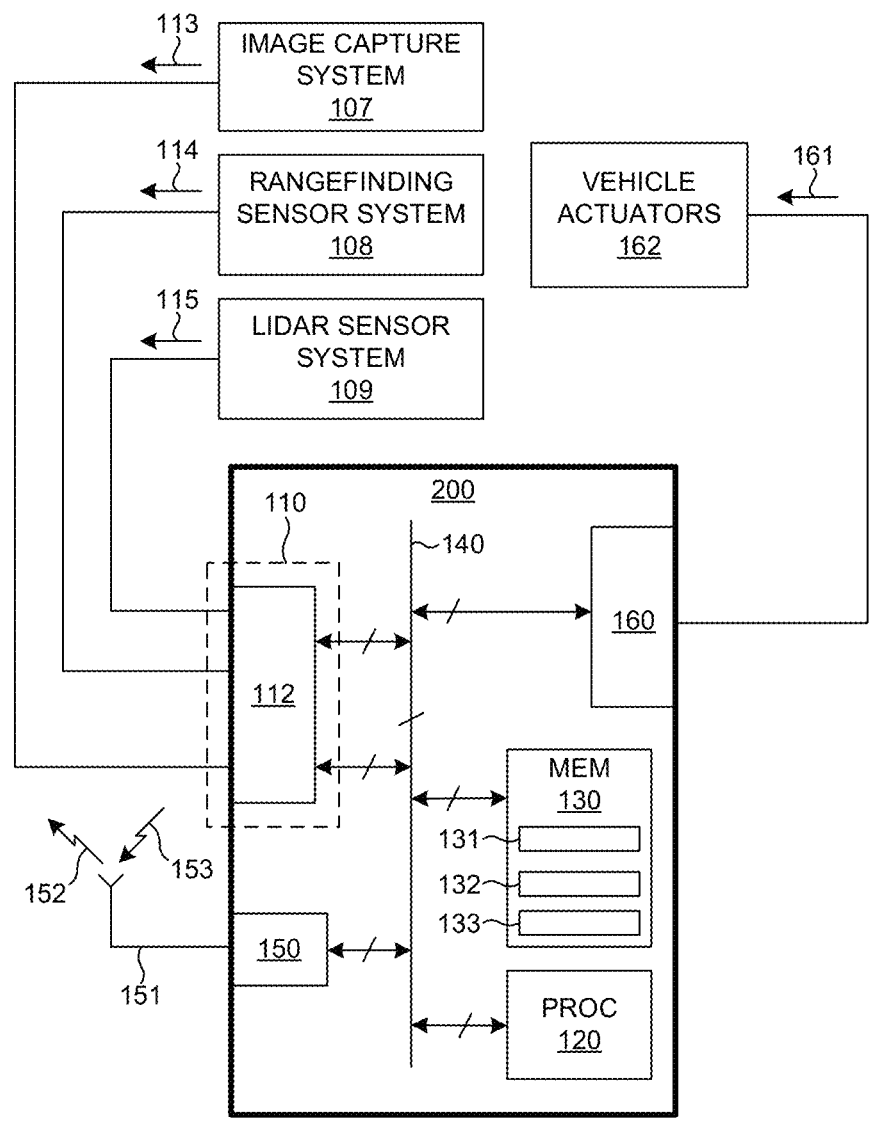
FIG. 3 is a schematic diagram illustrative of some elements of mobile robot 100.

FIG. 3 is a diagram illustrative of elements of a mobile robot 100 including computing system 200, image capture system 107, range finding sensor system 108, LIDAR sensor system 109, and vehicle actuators 162. In the embodiment depicted in FIG. 3, computing system 200 is communicatively coupled to image capture system 107, range finding sensor system 108, LIDAR sensor system 109, and vehicle actuators 162 by wired communications links. However, in general, computing system 200 may be communicatively coupled to any of the sensors and devices described herein by either a wired or wireless communication link. In general, any number of sensors to locate mobile robot 100 in a service environment and to identify nearby pedestrians and their respective velocities relative to mobile robot 100 may be communicatively coupled to computing system 200.

As depicted in FIG. 3, computing system 200 includes a sensor interface 110, at least one processor 120, a memory 130, a bus 140, a wireless communication transceiver 150, and a controlled device interface 160. Sensor interface 110, processor 120, memory 130, wireless communication transceiver 150, and controlled device interface 160 are configured to communicate over bus 140.

As depicted in FIG. 3, sensor interface 110 includes a digital input/output interface 112. In some other embodiments, sensor interface 110 includes analog to digital conversion (ADC) electronics (not shown), a wireless communications transceiver (not shown), or a combination thereof, to communicate with a sensor system to receive measurement data from one or more sensors. In general, any of the sensors described herein may be digital or analog sensors, and may be communicatively coupled to computing system 200 by the appropriate interface.

As depicted in FIG. 3, digital interface 112 is configured to receive signals 113 from image capture system 107, signals 114 from range finding sensor system 108, and signals 115 from LIDAR sensor system 109. In this example, image capture system 107 includes on-board electronics to generate digital signals 113 indicative of detected images. Similarly, range finding sensor system 108 includes on-board electronics to generate digital signals 114 indicative of distance measurements performed by range finding system 108, and LIDAR sensor system 109 includes on-board electronics to generate digital signals 115 indicative of distance measurements performed by LIDAR sensor system 109.

Controlled device interface 160 includes appropriate digital to analog conversion (DAC) electronics. In addition, in some embodiments, controlled device interface 160 includes a digital input/output interface. In some other embodiments, controlled device interface 160 includes a wireless communications transceiver configured to communicate with a device, including the transmission of control signals.

As depicted in FIG. 3, controlled device interface 160 is configured to transmit control commands 161 to the vehicle actuators 162 that cause the wheeled, robotic vehicle 101 to move at a desired velocity (i.e., both speed and direction) within the crowded pedestrian environment.

Memory 130 includes an amount of memory 131 that stores measurement data collected from sensors 107-109. Memory 130 also includes an amount of memory 132 that stores program code that, when executed by processor 120, causes processor 120 to implement navigation model training functionality and model based navigation functionality as described herein.

In some examples, processor 120 is configured to store digital signals generated by sensor interface 110 onto memory 131. In addition, processor 120 is configured to read the digital signals stored on memory 131 and transmit the digital signals to wireless communication transceiver 150. Wireless communications transceiver 150 is configured to communicate the digital signals from computing system 200 to an external computing device (not shown) over a wireless communications link. As depicted in FIG. 3, wireless communications transceiver transmits a radio frequency signal 152 over antenna 151. The radio frequency signal 152 includes digital information indicative of the digital signals to be communicated from computing system 200 to the external computing device. In one example, images collected by image capture device 123 and distances measured by range finding sensor system 108 and LIDAR sensor system 109 are communicated to an external computing system for purposes of monitoring the activities of the mobile robot.

In another example, wireless communications transceiver 150 is configured to communicate digital signals from an external computing device (not shown) to computing system 200 to over a wireless communications link. As depicted in FIG. 3, wireless communications transceiver receives a radio frequency signal 153 over antenna 151. In one example, the radio frequency signal 153 includes digital information indicative of the location of mobile robot 100 within the service environment.

Figure 4:
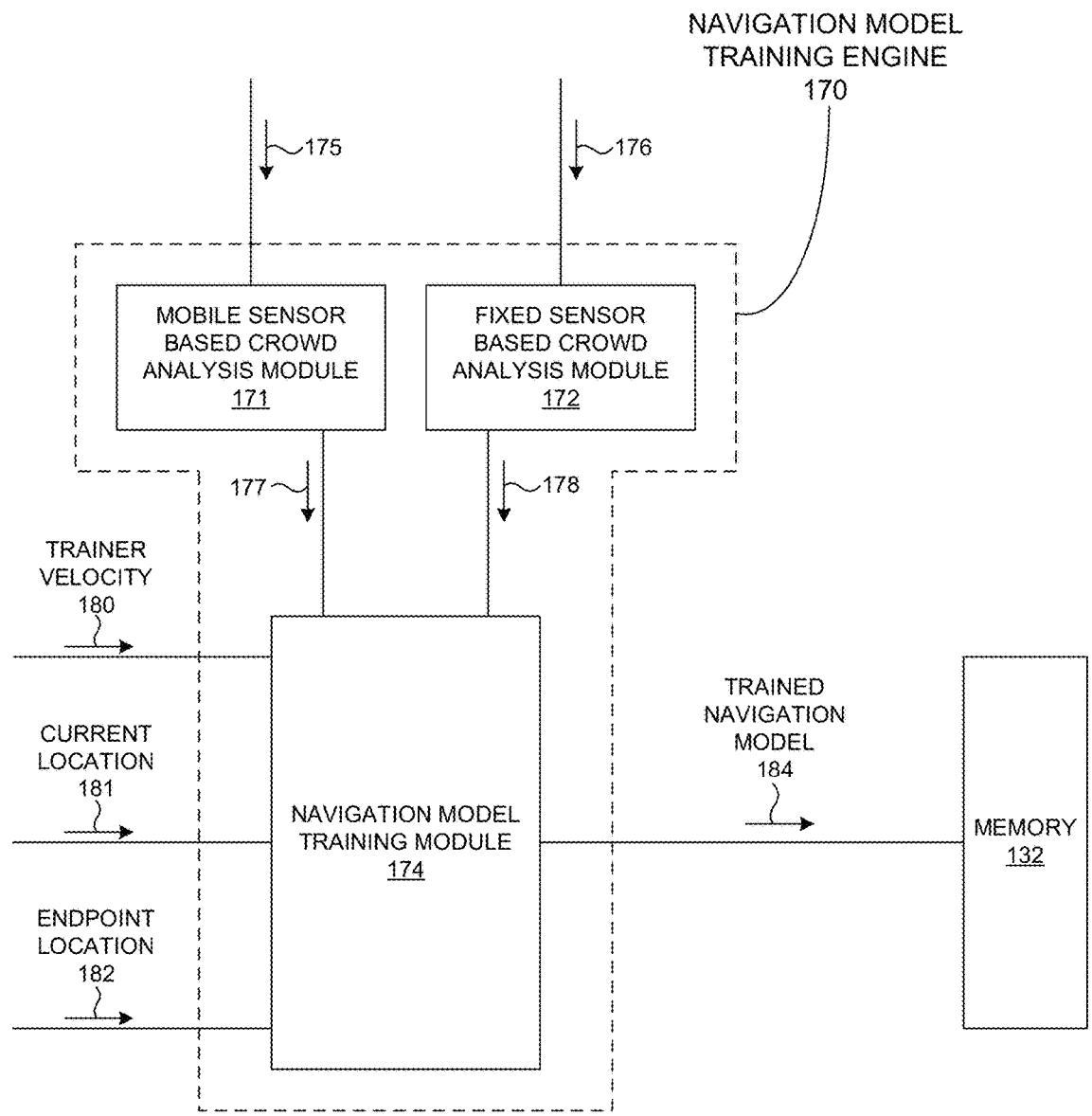
FIG. 4 is a diagram illustrative of an exemplary navigation model training engine 170 in one embodiment.

In one aspect, a computing system is configured as a navigation model training engine to train a navigation model employed to navigate mobile robot 100 through a crowded pedestrian environment by emulating pedestrian walking behaviors. In some examples, computing system 200 is configured as a navigation model training engine. In some other examples, an external computing system is configured as a navigation model training engine. FIG. 4 is a diagram illustrative of an exemplary navigation model training engine 170 in one embodiment. As depicted in FIG. 4, navigation model training engine 130 includes mobile sensor based crowd analysis module 171, fixed sensor based crowd analysis module 172, and navigation model training module 174.

Mobile sensor based crowd analysis module 171 receives signals 175 generated by sensors attached to a behavioral trainer who maneuvers from one location to another through a crowded pedestrian environment. Signals 175 are collected periodically while a behavioral trainer navigates a crowded pedestrian environment. In one example, a behavioral trainer is the mobile robot 100 navigated through a crowded pedestrian environment by a human. In this example, signals 175 may include image data collected by image capture system 107, range data collected by range finding sensor system 108, and range data collected by LIDAR system 109, while the mobile robot 100 navigates through the crowded pedestrian environment under human control. In another example, a behavioral trainer is a particular pedestrian navigating through the crowded pedestrian environment from one location to another. In this example, the pedestrian is instrumented with one or more sensors (e.g., an image capture system 107, a range sensor system 108, a LIDAR system 109, etc.). Signals 175 are collected periodically while the pedestrian navigates the crowded pedestrian environment.

Mobile sensor based crowd analysis module 171 processes signals 175 to determine the relative velocity 177 (i.e., speed and direction) of each pedestrian nearby a behavioral trainer with respect to the behavioral trainer at each sampling point in time. In some examples, mobile sensor based crowd analysis module 171 generates a time sequence of images of pedestrians nearby the behavioral trainer based on image data, rangefinder data, LIDAR data, or a combination thereof. The velocity of each nearby pedestrian relative to the behavioral trainer is determined from image sequence data at each sampling point in time.

Figure 6:
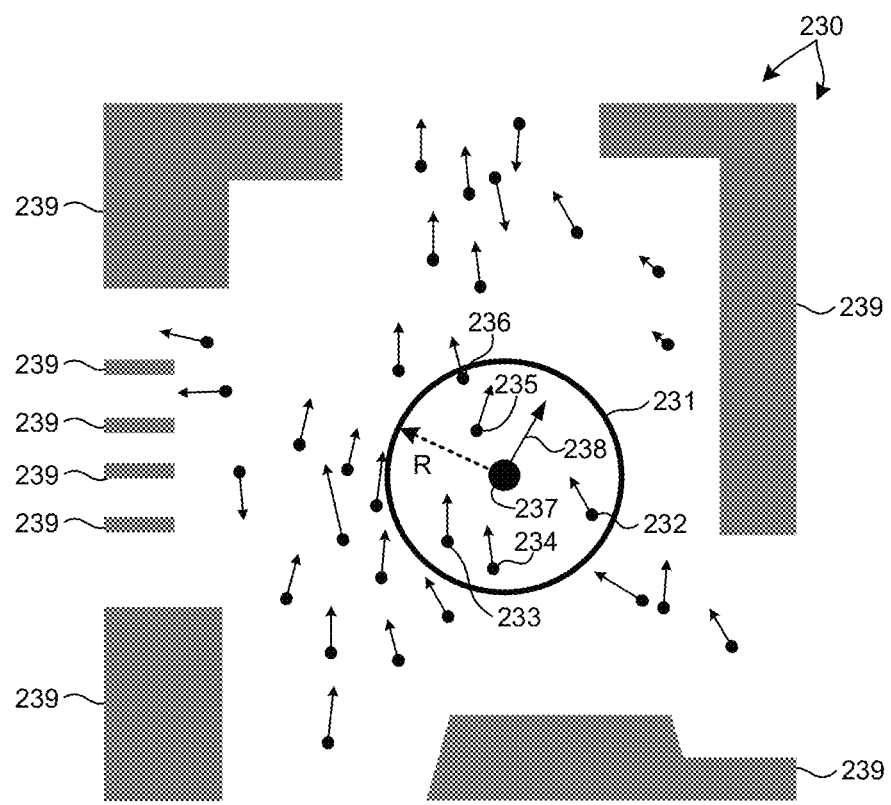
FIG. 6 depicts an illustration of a crowded pedestrian environment 230 in one instance.

FIG. 6 depicts an illustration of a crowded pedestrian environment 230 in one instance. The crowded pedestrian environment 230 includes a number of fixed structures 239 (e.g., building walls, turnstiles, etc.) and a number of pedestrians maneuvering through the environment. A behavioral trainer 237 within environment 230 moves with a particular velocity depicted by vector 238. Similarly, nearby pedestrians 232-236 each move at their own respective velocities indicated by the illustrated vectors. In this example, nearby pedestrians 232-236 are identified as pedestrians within a distance, R, from behavioral trainer 237 at any given instance.

In one example, mobile sensor based crowd analysis module 171 processes signals 175 to determine the velocity 177 (i.e., speed and direction) of pedestrians 232-236 relative to behavioral trainer 237 at the instance depicted in FIG. 6 and at each additional sampling point in time.

In general, nearby pedestrians may be identified for purposes of training and use of a navigation model in any suitable manner. In one example, nearby pedestrians may be identified as the N closest pedestrians, where N is any positive integer number. In another example, nearby pedestrians are identified as all pedestrians within a line of sight of the behavioral trainer or autonomous mobile robot.

Figure 7:
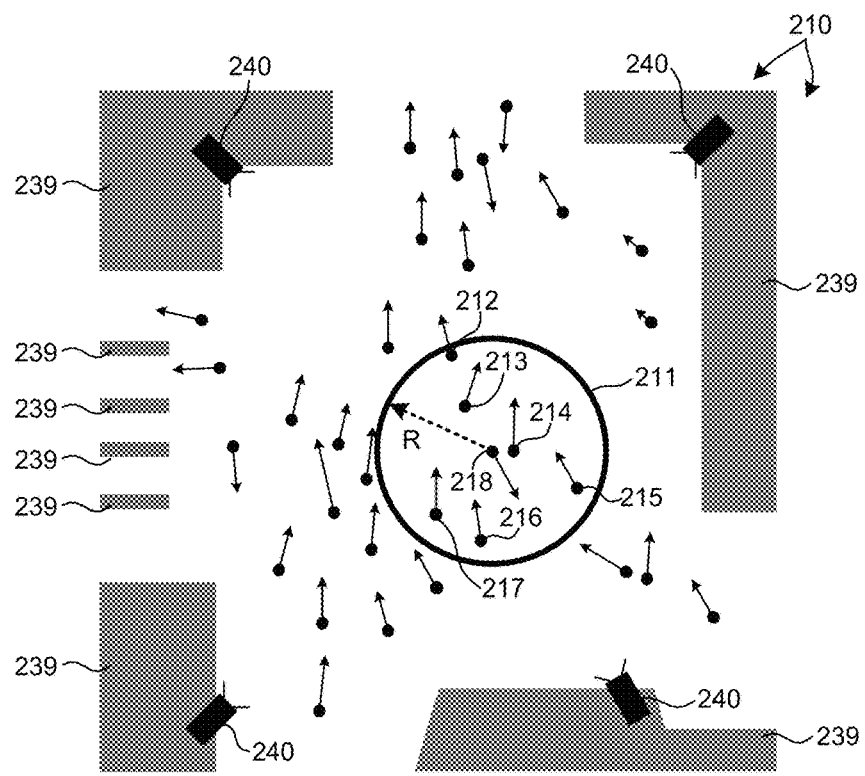
FIG. 7 depicts an illustration of a crowded pedestrian environment 210 in one instance highlighting one pedestrian as a behavioral trainer.
Figure 8:
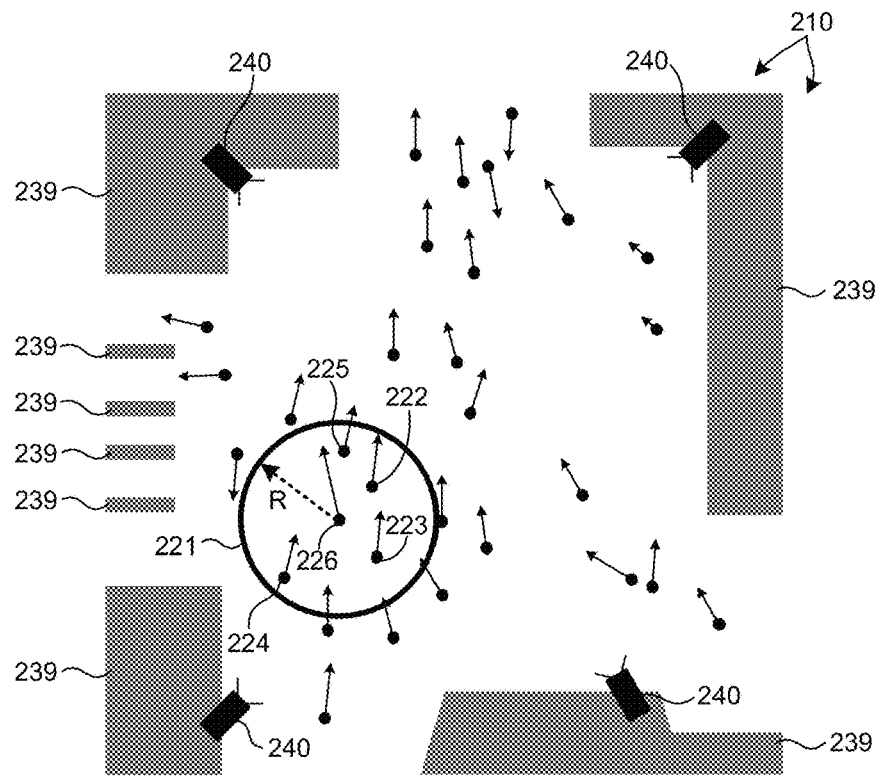
FIG. 8 depicts an illustration of the crowded pedestrian environment 210 in the same instance highlighting another pedestrian as a behavioral trainer.

Fixed sensor based crowd analysis module 172 receives signals 176 generated by sensors attached to fixed structures within the crowded pedestrian environment. For example, FIGS. 7 and 8 depict an illustration of a crowded pedestrian environment 210 in one instance. The crowded pedestrian environment 210 includes a number of pedestrians maneuvering among fixed structures 239. In this example, one or more cameras 240 are mounted to structures 239. The cameras 240 generate image data 176 that is received by fixed sensor based crowd analysis module 172. Signals 176 are collected periodically while a behavioral trainer navigates a crowded pedestrian environment.

In this example, a behavioral trainer may be any of the pedestrians participating in the crowded pedestrian environment 210. In one example, signals 176 include a time sequence of images of crowded pedestrian environment 210. Based on signals 176, fixed sensor based crowd analysis module 172 identifies one or more behavioral trainers among the pedestrians whose maneuvers are captured within the image data of signals 176. In addition, fixed sensor based crowd analysis module 172 processes signals 176 to determine the velocity 178 (i.e., speed and direction) of each nearby pedestrian with respect to each respective behavioral trainer at each sampling point in time.

In one example, depicted in FIG. 7, fixed sensor based crowd analysis module 172 identifies behavioral trainer 218 illustrated within environment 210. Behavioral trainer 218 moves with a particular velocity depicted by the illustrated vector. Similarly, nearby pedestrians 212-217 each move at their own respective velocities indicated by the illustrated vectors. In this example, fixed sensor based crowd analysis module 172 identifies nearby pedestrians 212-218 as pedestrians within a distance, R, from behavioral trainer 218 at any given instance. In addition, fixed sensor based crowd analysis module 172 determines the velocity of each nearby pedestrian 212-217 relative to behavioral trainer 218 based on image sequence data at each sampling point in time.

In another example, depicted in FIG. 8, fixed sensor based crowd analysis module 172 identifies another behavioral trainer 226 illustrated within environment 210. Behavioral trainer 226 moves with a particular velocity depicted by the illustrated vector. Similarly, nearby pedestrians 222-225 each move at their own respective velocities indicated by the illustrated vectors. In this example, fixed sensor based crowd analysis module 172 identifies nearby pedestrians 222-225 as pedestrians within a distance, R, from behavioral trainer 226 at any given instance. In addition, fixed sensor based crowd analysis module 172 determines the velocity of each nearby pedestrian 222-225 relative to behavioral trainer 226 based on image sequence data at each sampling point in time.

In general, one or more different types of sensors may be mounted to fixed structures within the crowded pedestrian environment to capture data suitable for estimation of velocities of behavioral trainers and nearby pedestrians by fixed sensor based crowd analysis module 172. For example, sensors such as cameras, range finders, and LIDAR devices may be employed.

As depicted in FIG. 4, both mobile sensor based crowd analysis module 171 and fixed sensor based crowd analysis module 172 are employed to generate velocity information 177 and 178, respectively. This velocity information forms the basis for navigation model training. However, in general, either mobile sensor based crowd analysis module 171 or fixed sensor based crowd analysis module 172 may be employed exclusively to generate velocity information for navigation model training.

As depicted in FIG. 4, navigation model training module 174 trains a navigation model 184 that enables a mobile robot to navigate through a crowded pedestrian environment from one location to another in a manner that emulates pedestrian walking behavior exhibited by one or more behavior trainers. The trained navigation model 184 determines the desired velocity of the mobile robot (i.e., speed and steering angle) at each sample period based on the mobile robots current position, desired endpoint location, and the relative velocity of one or more nearby pedestrians with respect to the mobile robot.

Navigation model training module 174 receives sets of training data each associated with a maneuver of a behavior trainer from a start location to a desired endpoint location through a crowded pedestrian environment. Each set of training data includes a current location 181, an endpoint location 182 corresponding to the maneuver, a measured velocity of the behavioral trainer 180, and relative velocity information 177 and 178 associated with nearby pedestrians for each sample period of the complete maneuver. Navigation model training module 174 trains a navigation model 184 to determine a desired velocity of a mobile robot based on its current location, desired endpoint location, and the relative velocity of nearby pedestrians. The trained navigation model 184 is stored in a memory (e.g., memory 133 depicted in FIG. 3).

In some examples, the velocity 180 of the behavioral trainer is measured on-board the behavioral trainer. For example, in embodiments where a mobile robot or an instrumented human is employed as a behavioral trainer, sensors on-board the mobile robot or the instrumented human are employed to estimate the velocity of the behavioral trainer. In one example, dead reckoning sensors on board the mobile robot may be employed to estimate its velocity at any given time. In another example, an indoor positioning system may be employed to estimate the velocity of the mobile robot or an instrumented human at any given time.

In some other examples, the velocity of the behavioral trainer is measured based on sensors fixed to the environment. For example, in embodiments where a behavioral trainer is selected from one or more participants in a pedestrian traffic flow as described with reference to FIGS. 7-8, velocity information 178 includes the velocity of the behavioral trainer at each sample period.

In general, the trained navigation model 184 is a direct, functional relationship between measurements of current location and the relative velocities of nearby pedestrians and a velocity command that causes a mobile robot to emulate pedestrian walking behaviors.

In general, the trained navigation model described herein may be implemented as a neural network model, a convolutional network model, a support vector machines model, a response surface model, a polynomial model, a random forest model, a deep network model, or other types of models. In some examples, a trained navigation model described herein may be implemented as a combination of models.

In a further aspect, the behavioral trainers employed to generate teaching data for navigation model training are selected to reinforce desired pedestrian walking behaviors. In the examples described with reference to FIGS. 7-8, any of the recorded pedestrians may serve as a behavioral trainer. However, it is desirable to limit the set of behavioral trainers to those who exhibit desired pedestrian walking behaviors. For example, pedestrians who move quickly from one train platform to another, from a train platform to an exit, from a storage locker to a train platform, or vice-versa, are desirable behavioral trainers. However, pedestrians who stop in the middle of a flow of people, move against a flow of people, move to a corner and stop, move randomly relative to a persistent flow of people are undesirable behavioral trainers. In this manner, pedestrians who exhibit desirable pedestrian walking behaviors are included in the training set and those who exhibit undesirable pedestrian walking behaviors are excluded from the training set.

In some examples, fixed sensor based crowd analysis module 172 is configured to filter signals 176 to select behavioral trainers that exhibit desirable pedestrian walking behaviors. In one example, fixed sensor based crowd analysis module 172 determines the difference in movement direction between a candidate behavioral trainer and nearby pedestrians. If the difference is less than a predetermined threshold value, the candidate behavioral trainer is selected to participate in the training set, and if the difference exceeds the predetermined threshold value, the candidate behavioral trainer is excluded from the training set. In these examples, the value of the predetermined threshold value is set to isolate behavioral trainers who exhibit flow-following behavior (i.e., move in a similar direction as nearby pedestrians).

Figure 5:
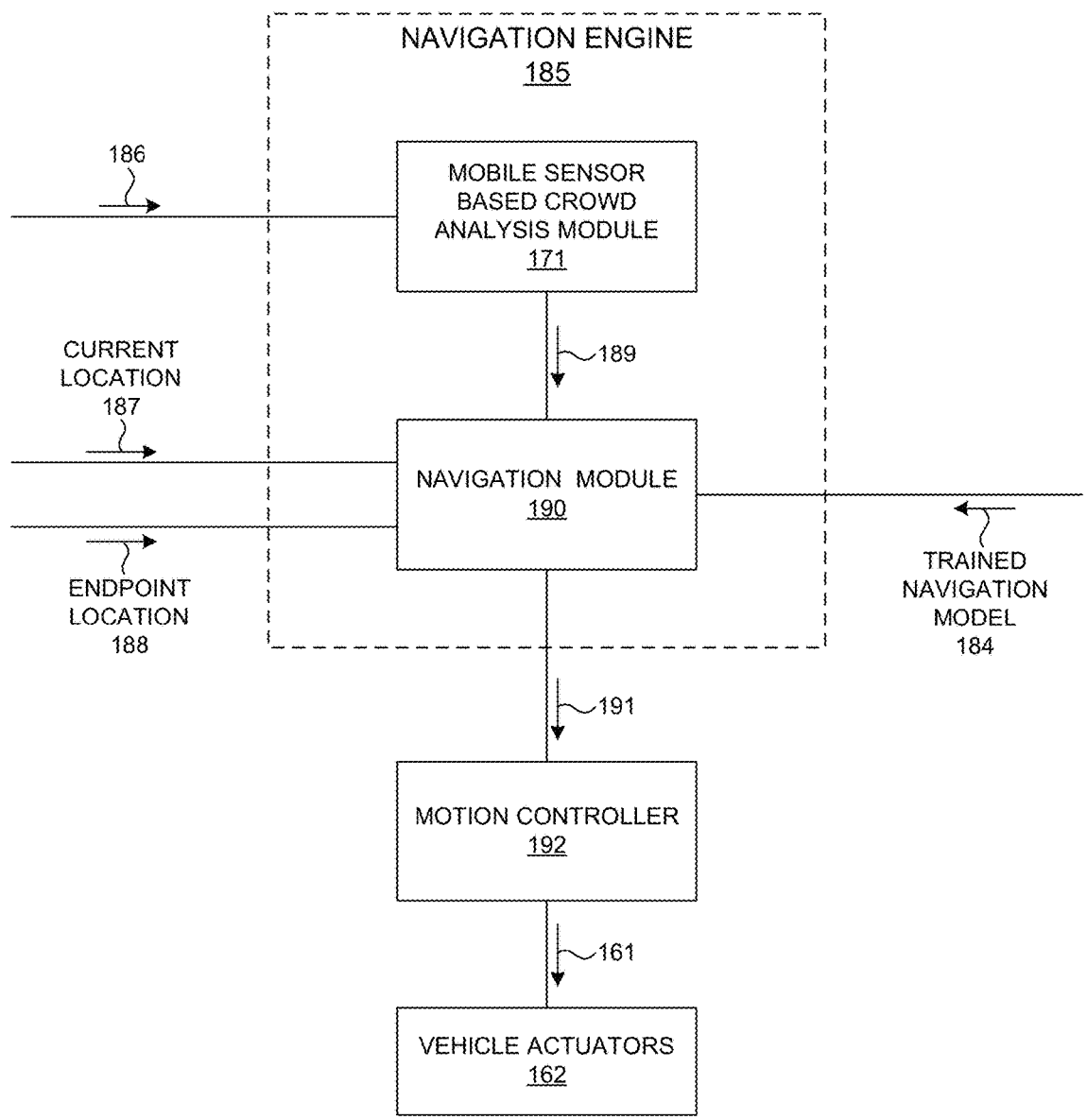
FIG. 5 is a diagram illustrative of an exemplary navigation engine 185 in one embodiment.

In another aspect, computing system 200 is configured as a navigation engine to directly determine a desired velocity of a mobile robot based on desired endpoint position and measurements of current position and the relative velocities of nearby pedestrians using a trained navigation model. FIG. 5 is a diagram illustrative of an exemplary navigation engine 185 in one embodiment. As depicted in FIG. 5, navigation engine 185 includes mobile sensor based crowd analysis module 171, as described with reference to FIG. 4, and a navigation module 190.

In one embodiment, mobile robot 100 is tasked with navigating from its current location to a desired endpoint location through a crowded pedestrian environment. Mobile sensor based crowd analysis module 171 receives signals 186 from sensors on-board mobile robot 100 (e.g., signals 113-115, or any combination thereof). Mobile sensor based crowd analysis module 171 identifies nearby pedestrians and determines the relative velocity of each identified pedestrian with respect to mobile robot 100 and communicates this velocity information 189 to navigation module 190. Navigation module 190 also receives an indication 187 of the current location of the mobile robot within the service environment and a desired endpoint location 188 in the service environment. Navigation module 190 employs trained navigation model 184 to determine a desired velocity 191 of the mobile robot for the current sample period based on the current location 187, the desire endpoint location 188, and the velocity information 189. The desired velocity 191 is communicated to a motion controller 192 (e.g., implemented on computing system 200) that generates command signals 161. The command signals 161 are communicated to vehicle actuators 162 of mobile robot 100 to move mobile robot 100 at the desired velocity 191. Velocity information 189 from mobile sensor based crown analysis module 171 and current position information (e.g., from an indoor positioning system, etc.) are repeatedly sampled, and the desired velocity is repeatedly updated. In this manner, navigation module 190 navigates mobile robot 100 through a crowded pedestrian environment with a minimum of disruption to traffic flow.

Figure 9:
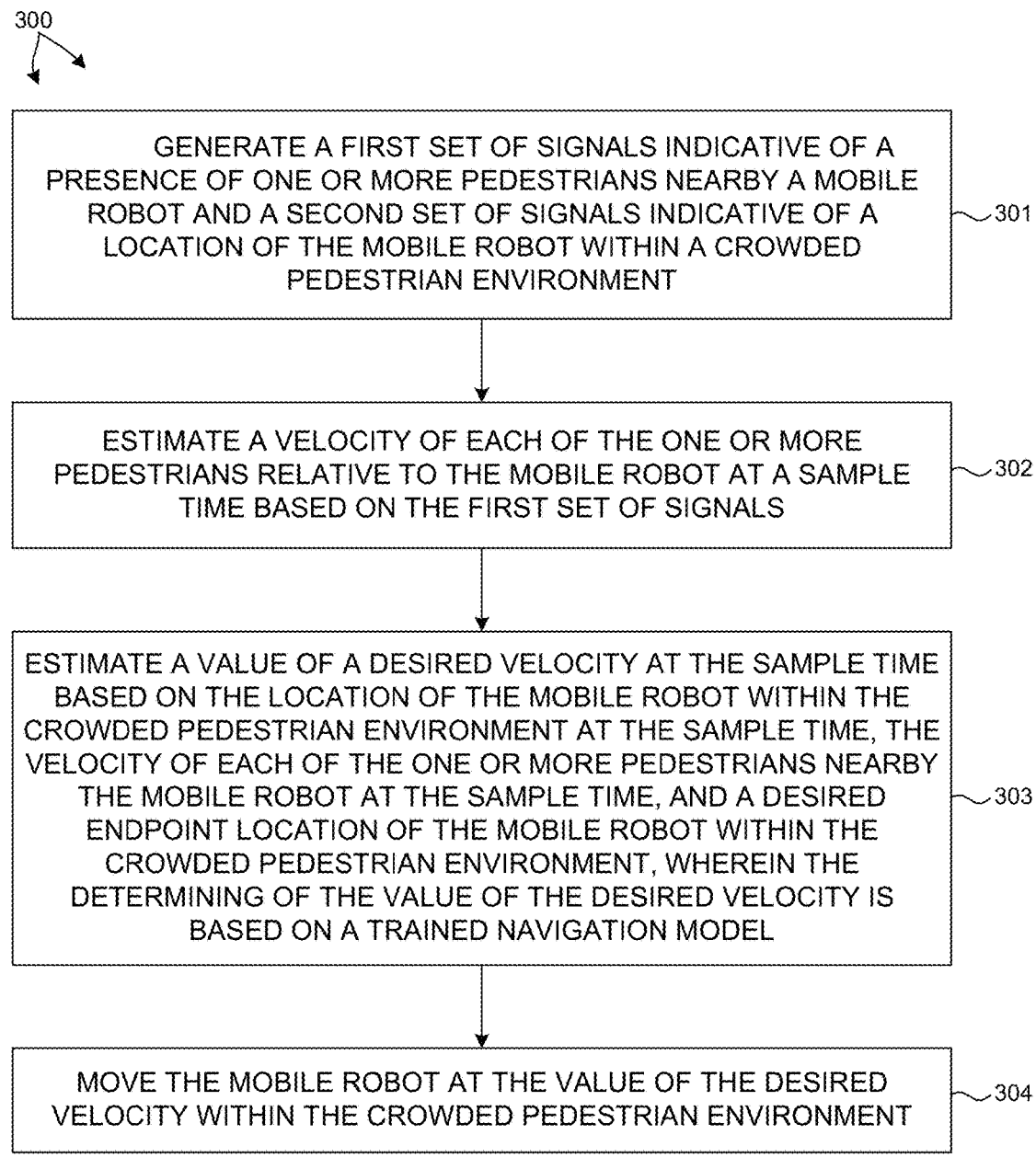
FIG. 9 illustrates a flowchart of a method 300 implementing navigation of a mobile robot through a crowded pedestrian environment as described herein.

FIG. 9 illustrates a flowchart of a method 300 suitable for implementation by a mobile robot as described herein. In some embodiments, mobile robot 100 is operable in accordance with method 300 illustrated in FIG. 9. However, in general, the execution of method 300 is not limited to the embodiments of mobile robot 100 described with reference to FIGS. 1-5. These illustrations and corresponding explanation are provided by way of example as many other embodiments and operational examples may be contemplated.

In block 301, a first set of signals indicative of a presence of one or more pedestrians nearby a mobile robot is generated, for example, by sensors on-board mobile robot 100 or sensors fixed within a crowded pedestrian environment. In addition, a second set of signals indicative of a location of the mobile robot within a crowded pedestrian environment is also generated, for example, by an indoor positioning system.

In block 302, a velocity of each of the one or more pedestrians relative to the mobile robot is generated at a sample time based on the first set of signals.

In block 303, a value of a desired velocity of the mobile robot is estimated at the sample time based on the location of the mobile robot within the crowded pedestrian environment at the sample time, the velocity of each of the one or more pedestrians nearby the mobile robot at the sample time, and a desired endpoint location of the mobile robot within the crowded pedestrian environment. The determining of the value of the desired velocity is based on a trained navigation model.

In block 304, the mobile robot is moved at the value of the desired velocity within the crowded pedestrian environment.

Computing system 200 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 132 implementing methods such as those described herein may be transmitted over a transmission medium such as a wire, cable, or wireless transmission link. For example, as illustrated in FIG. 1, program instructions 132 stored in memory 130 are transmitted to processor 120 over bus 140. Program instructions 132 are stored in a computer readable medium (e.g., memory 130). Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
   a mobile robot including one or more actuators that cause the mobile robot to move at a desired velocity;
   one or more sensor systems disposed on the mobile robot that generate a first set of signals indicative of the presence of a plurality of pedestrians nearby the mobile robot and a second set of signals indicative of a location of the mobile robot within a crowded pedestrian environment;
   a mobile sensor based crowd analysis module configured to estimate a velocity of each of the plurality of pedestrians relative to the mobile robot at a sample time based on the first set of signals; and
   a navigation module configured to estimate a value of the desired velocity at the sample time based on the location of the mobile robot within the crowded pedestrian environment at the sample time, the velocity of each of the plurality of pedestrians relative to the mobile robot at the sample time, and a desired endpoint location of the mobile robot within the crowded pedestrian environment, wherein the determining of the value of the desired velocity is based on a trained navigation model.

2. The system of claim 1, further comprising:
   a navigation model training module configured to train the navigation model based on a set of pedestrian walking maneuvers, wherein each pedestrian walking maneuver involves tracking a movement of a behavioral trainer through a crowded pedestrian environment from a particular starting location to a particular endpoint location, wherein a position and velocity of nearby pedestrians relative to the behavioral trainer and a position and velocity of the behavioral trainer are periodically measured during each pedestrian walking maneuver.

3. The system of claim 2, wherein the behavioral trainer is a mobile robot navigated through the crowded pedestrian environment by a human.

4. The system of claim 2, wherein the behavioral trainer is a human who navigates through the crowded pedestrian environment.

5. The system of claim 2, wherein the position and velocity of nearby pedestrians relative to the behavioral trainer and the position and velocity of the behavioral trainer are periodically measured by the one or more sensor systems disposed on the mobile robot.

6. The system of claim 2, further comprising:
   one or more sensor systems fixed to one or more locations in the crowded pedestrian environment, wherein the position and velocity of nearby pedestrians relative to the behavioral trainer and the position and velocity of the behavioral trainer are periodically measured by the one or more sensor systems fixed to the one or more locations.

7. The system of claim 6, wherein the set of pedestrian walking maneuvers is selected from a larger set of pedestrian walking maneuvers if a difference in direction between a behavioral trainer associated with a particular walking maneuver and each nearby pedestrian is less than a predetermined threshold value during the particular pedestrian walking maneuver.

8. The system of claim 1, wherein the one or more sensor systems includes any of an image capture system, a range finding sensor system, and a LIDAR sensor system.

9. A system comprising:
   a mobile robot including one or more actuators that cause the mobile robot to move at a desired velocity;
   one or more sensor systems disposed on the mobile robot that generate a first set of signals indicative of the presence of a plurality of pedestrians nearby the mobile robot and a second set of signals indicative of a location of the mobile robot within a crowded pedestrian environment; and a non-transitory, computer-readable medium comprising instructions that when executed by a computing system cause the computing system to:
  estimate a velocity of each of the plurality of pedestrians relative to the mobile robot at a sample time based on the first set of signals; and
  estimate a value of the desired velocity at the sample time based on the location of the mobile robot within the crowded pedestrian environment at the sample time, the velocity of each of the plurality of pedestrians relative to the mobile robot at the sample time, and a desired endpoint location of the mobile robot within the crowded pedestrian environment, wherein the determining of the value of the desired velocity is based on a trained navigation model.

10. The system of claim 9, the non-transitory, computer-readable medium further comprising instructions that when executed by the computing system cause the computing system to:
  train the navigation model based on a set of pedestrian walking maneuvers, wherein each pedestrian walking maneuver involves tracking a movement of a behavioral trainer through a crowded pedestrian environment from a particular starting location to a particular endpoint location, wherein a position and velocity of nearby pedestrians relative to the behavioral trainer and a position and velocity of the behavioral trainer are periodically measured during each pedestrian walking maneuver.

11. The system of claim 10, wherein the behavioral trainer is a mobile robot navigated through the crowded pedestrian environment by a human.

12. The system of claim 10, wherein the behavioral trainer is a human who navigates through the crowded pedestrian environment.

13. The system of claim 10, wherein the position and velocity of nearby pedestrians relative to the behavioral trainer and the position and velocity of the behavioral trainer are periodically measured by the one or more sensor systems disposed on the mobile robot.

14. The system of claim 10, further comprising:
  one or more sensor systems fixed to one or more locations in the crowded pedestrian environment, wherein the position and velocity of nearby pedestrians relative to the behavioral trainer and the position and velocity of the behavioral trainer are periodically measured by the one or more sensor systems fixed to the one or more locations.

15. The system of claim 14, wherein the set of pedestrian walking maneuvers is selected from a larger set of pedestrian walking maneuvers if a difference in direction between a behavioral trainer associated with a particular walking maneuver and each nearby pedestrian is less than a predetermined threshold value during the particular pedestrian walking maneuver.

16. The system of claim 9, wherein the one or more sensor systems includes any of an image capture system, a range finding sensor system, and a LIDAR sensor system.

17. A method comprising:
  generating a first set of signals indicative of a presence of a plurality of pedestrians nearby a mobile robot and a second set of signals indicative of a location of the mobile robot within a crowded pedestrian environment; and
  estimating a velocity of each of the plurality of pedestrians relative to the mobile robot at a sample time based on the first set of signals; and
  estimating a value of a desired velocity at the sample time based on the location of the mobile robot within the crowded pedestrian environment at the sample time, the velocity of each of the plurality of pedestrians nearby the mobile robot at the sample time, and a desired endpoint location of the mobile robot within the crowded pedestrian environment, wherein the determining of the value of the desired velocity is based on a trained navigation model; and
  moving the mobile robot at the value of the desired velocity within the crowded pedestrian environment.

18. The method of claim 17, further comprising:
  training the navigation model based on a set of pedestrian walking maneuvers, wherein each pedestrian walking maneuver involves tracking a movement of a behavioral trainer through a crowded pedestrian environment from a particular starting location to a particular endpoint location, wherein a position and velocity of nearby pedestrians relative to the behavioral trainer and a position and velocity of the behavioral trainer are periodically measured during each pedestrian walking maneuver.

19. The method of claim 18, wherein the behavioral trainer is a mobile robot navigated through the crowded pedestrian environment by a human.

20. The method of claim 18, wherein the behavioral trainer is a human who navigates through the crowded pedestrian environment.

* * * * *